(12) United States Patent  
Browning

(10) Patent No.: US 8,810,065 B2
(45) Date of Patent: *Aug. 19, 2014

(54) METHOD TO REDUCE SYSTEM IDLE POWER THROUGH SYSTEM VR OUTPUT ADJUSTMENTS DURING SOIX STATES

(71) Applicant: Intel Corporation, Santa Clara, CA (US)

(72) Inventor: David W. Browning, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,514

(22) Filed: Jan. 29, 2013

(65) Prior Publication Data

US 2013/0200705 A1 Aug. 8, 2013

Related U.S. Application Data

(63) Continuation of application No. 12/748,913, filed on Mar. 29, 2010, now Pat. No. 8,362,645.

(51) Int. Cl.
*H02J 1/10* (2006.01)

(52) U.S. Cl.
USPC .......................................................... 307/52

(58) Field of Classification Search
USPC .......................................................... 307/52
See application file for complete search history.

(56) References Cited

U.S. PATENT DOCUMENTS

| 7,594,126 | B2 | 9/2009 | Yun et al. |
| 7,624,291 | B2 | 11/2009 | Nguyen |
| 8,362,645 | B2 * | 1/2013 | Browning ........................ 307/52 |
| 2003/0056127 | A1 | 3/2003 | Vaglica |
| 2003/0226048 | A1 | 12/2003 | Nguyen et al. |
| 2005/0238083 | A1 | 10/2005 | Laroia |
| 2005/0283625 | A1 | 12/2005 | Rotem et al. |
| 2006/0098556 | A1 | 5/2006 | Tanner |
| 2006/0259800 | A1 | 11/2006 | Maejima |
| 2007/0008011 | A1 * | 1/2007 | Thurston ......................... 326/93 |
| 2007/0079154 | A1 | 4/2007 | Diefenbaugh et al. |

FOREIGN PATENT DOCUMENTS

| CN | 1599893 | 3/2005 |
| CN | 1841266 | 10/2006 |
| JP | 2004-114319 | 4/2004 |
| JP | 2005-190483 | 7/2005 |
| JP | 2006-318380 | 11/2006 |

OTHER PUBLICATIONS

UK Office Action dated Jul. 29, 2011 for Application GP 1105257.8.
Japanese Office Action dated Sep. 20, 2012 for Application 2011-070691 and English language translation.

(Continued)

*Primary Examiner* — Robert L. Deberadinis
(74) *Attorney, Agent, or Firm* — KED & Associates

(57) ABSTRACT

An electronic device includes a power control circuit to generate a power mode signal and a plurality of voltage regulators to receive the power mode signal. Each voltage regulator reduces an output voltage in response to the power mode signal, and the reduced output voltage of each voltage regulator is used to power a different circuit of or function to be performed in the electronic device.

15 Claims, 6 Drawing Sheets

(56) References Cited

OTHER PUBLICATIONS

Japanese Office Action dated Jun. 19, 2013 for Application 2011-070691 and English language translation.

German Office Action dated Jun. 20, 2012 for Application 132102 and English language translation.

Chinese Office Action dated Jun. 3, 2013 for Application 201110113103.5 and English language translation.

* cited by examiner

METHOD TO REDUCE SYSTEM IDLE POWER THROUGH SYSTEM VR OUTPUT ADJUSTMENTS DURING S0IX STATES

This application is a Continuation Application of U.S. application Ser. No. 12/748,913 filed Mar. 29, 2010 (now U.S. Pat. No. 8,362,645 issued Jan. 29, 2013), the subject matter of which is incorporated herein by reference.

FIELD

One or more embodiments described herein relate to power management.

BACKGROUND

Power management continues to be a goal of system designers. One approach to minimizing power consumption involves changing the operating state of the system. However, even when such a state change is performed, voltage regulators (VRs) in the system are maintained at constant output voltage. Consequently, system power load remains constant even when activity of the system circuits is not constant, e.g., inactive.

DETAILED DESCRIPTION

Figure 1:
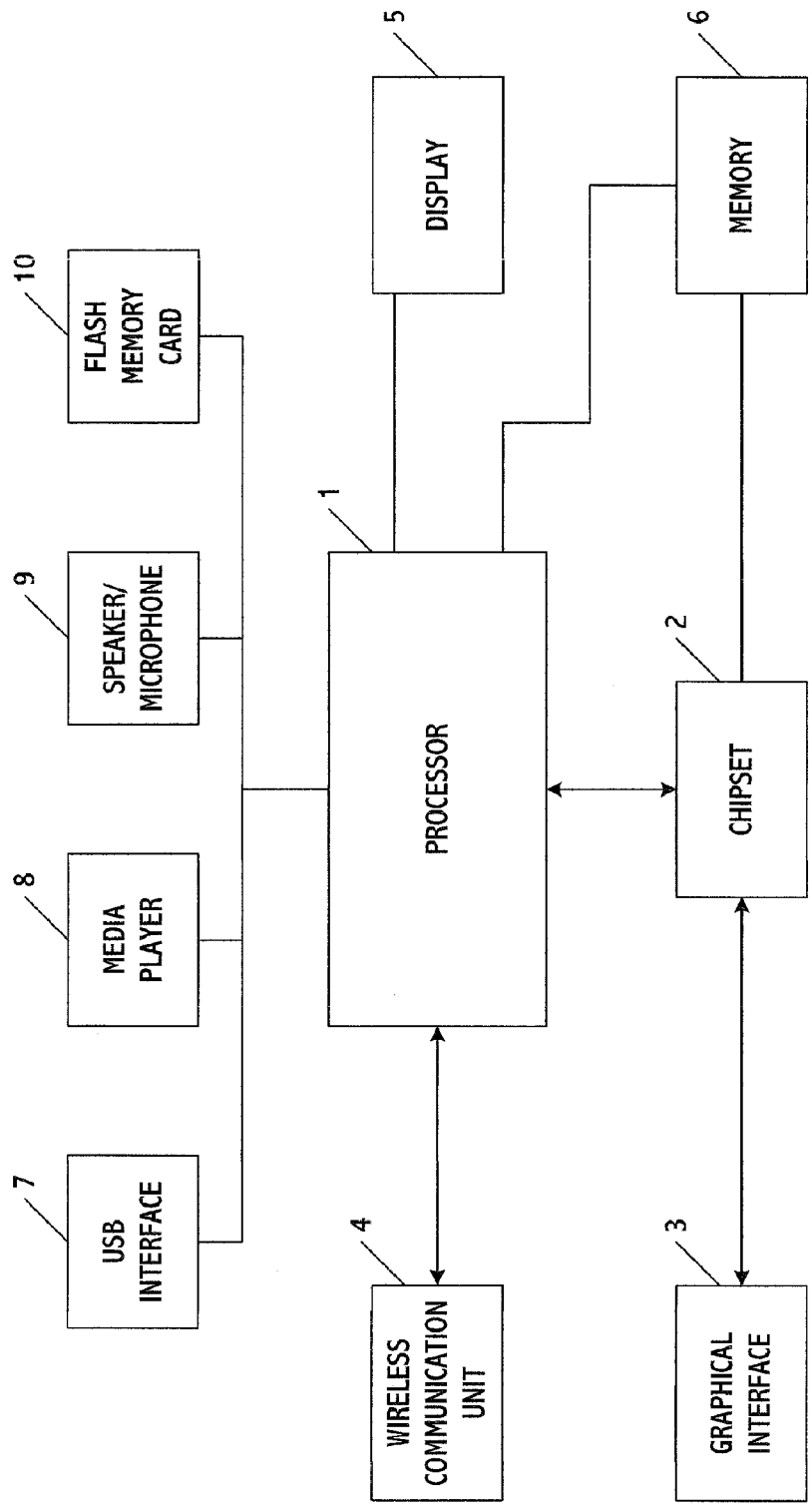
FIG. 1 is a diagram showing an example of a device subject to power control.

FIG. 1 shows an example of an electronic device subject to power management in accordance with one or more embodiments of the present invention. The electronic device may be any one of a number of battery-powered devices such as but not limited to a mobile phone, personal digital assistant, media player, or laptop or notebook computer. Alternatively, the device may be an AC-powered device that is usually used at a fixed location such as a desktop computer, television, DVD or other type of media player, surround-sound or other media receiver just to name a few.

As shown, the electronic device may include a processor 1, chipset 2, graphical interface 3, wireless communications unit 4, display 5, memory 6, and a plurality of functional circuits including a USB interface 7, media player 8, speaker and microphone circuits 9, and a flash memory card 10. In other embodiments, a different combination or arrangements of circuits and functions may be included.

Especially in the case wherein the electronic device is battery powered, a management scheme may be employed for purposes of saving power and increasing the operating life of the device while powered by the battery. One type of power management scheme involves setting the device in various power modes depending, for example, on the workload or activity of the device. An example of the different power modes, or power states, is set forth below:

System Power State S0 the ON state: The system is completely operation, fully powered and completely retains the context.

System Power State S1 the Sleep state: The system consumes less power than S0 state. All Hardware & Processor context is maintained.

System Power State S2 the Sleep state: The system consumes less power than S1 state. Processor loses power and processor context and contents of the cache are lost.

System Power State S3 the Sleep state: The system consumes less power than S2 state. Processor & Hardware context, cache contents, and chipset context are lost. The system memory is retained.

System Power State S4 the Hibernate state: The system consumes the least power compared to all other sleep states. The system is almost at an OFF state, expect for a trickle power. The context data is written to hard drive (disk)and there is no context retained.

System Power State S5 the OFF state: The system is in a shutdown state and the system retains no context. Note that in power state S4 the system can restart from the context data stored on the disk, but in S5 the system requires a These states may be implemented, for example, when the electronic device is a notebook computer, but the embodiments described herein are in no way to be limited to such an example. Moreover, any one or more of states S1 to S5 may be considered to be an idle state, and a state of idleness may also be found within the S0 state in certain circumstances.

Figure 2:
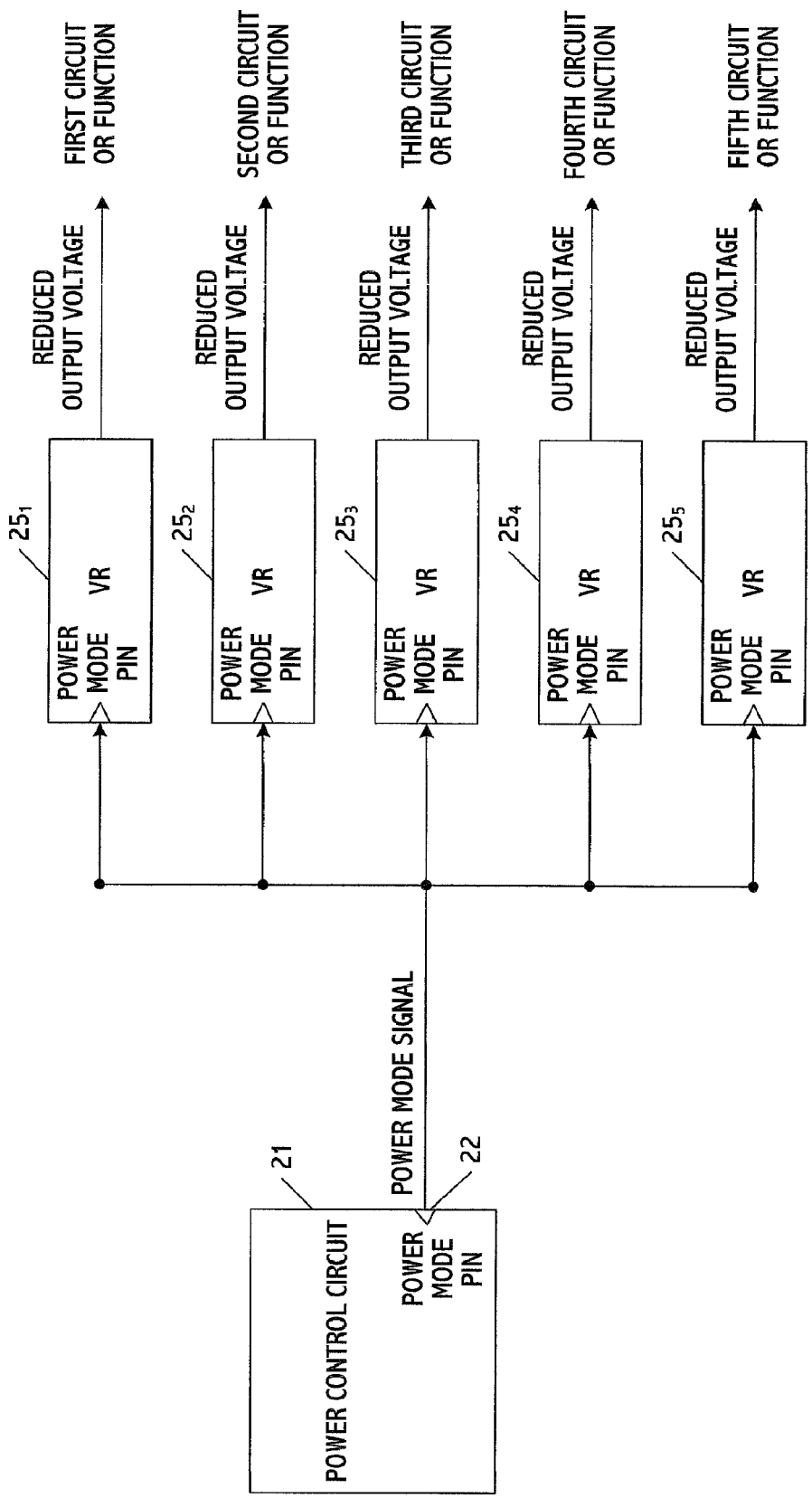
FIG. 2 is a diagram showing one embodiment of a power management circuit.

FIG. 2 shows one embodiment of a power management circuit for controlling power in an electronic device as previously described. The power management circuit includes a power control circuit 21 which generates a power mode signal. The power management circuit may be the processor or chipset shown in FIG. 1 or a different circuit such as but not limited to a specially dedicated power management circuit.

The power mode signal may be output from a specialized pin (e.g., power mode pin) 22 of the power control circuit. Alternatively, the power mode signal may be generated or otherwise derived from an existing pin of the power control circuit. For example, when the power control circuit is the chipset of the device, a pre-existing chipset pin may be used to generate the power mode signal.

In accordance with one embodiment, the power control signal is output to a plurality of voltage regulators $25_1$, $25_2$, $25_3$, $25_4$, and $25_5$. Each voltage regulator includes a power mode pin which receives the power mode signal. In response to a predetermined logical value on this pin, each voltage regulator reduces its output voltage by a predetermined amount or to within a predetermined range. According to one embodiment, the number of voltage regulators that receive the power mode signal is fewer than all the voltage regulators used in the electronic device. Accordingly, the voltage regulators that are to generate a reduced output voltage may be selectively and independently controlled relative to other voltage regulators which are not coupled to receive the power mode signal.

In accordance with one embodiment, many or even all of the voltage regulators reduce their output voltages to a same value or to within a same predetermined range. The predetermined range may be set relative to nominal output voltage of each voltage regulator, a certain percentage below a maximum voltage capable of being supported in the reduced power state corresponding to the power mode signal, a maximum operating voltage of the device, or another voltage.

These voltage regulators which have their output voltages reduced may include not only ones which control a main processor or central processing unit, but also ones that control other circuits including but not limited to the graphics circuits and/or any of the other circuits shown, for example, in FIG. 1 apart from the central processing unit.

For example, in one application, power platforms are provided for each of a plurality of circuits in a device and the output voltages of the voltage regulators used to power each platform are adjusted. The adjustments made be made for idleness periods for these platforms within, for example, a Converged Platform Power Management (CPPM) architecture.

In an alternative embodiment, the voltage regulators may output different voltage values or voltages in different predetermined reduced ranges in response to receipt of the power mode signal. These different values or ranges may be set, for example, based on the functions or operations to be performed using the voltage regulator outputs in the power state corresponding to the power mode signal. As shown in FIG. 2, the output voltage of each voltage regulator may be coupled to a different circuit or used to perform a different function within the electronic device.

Figure 3:
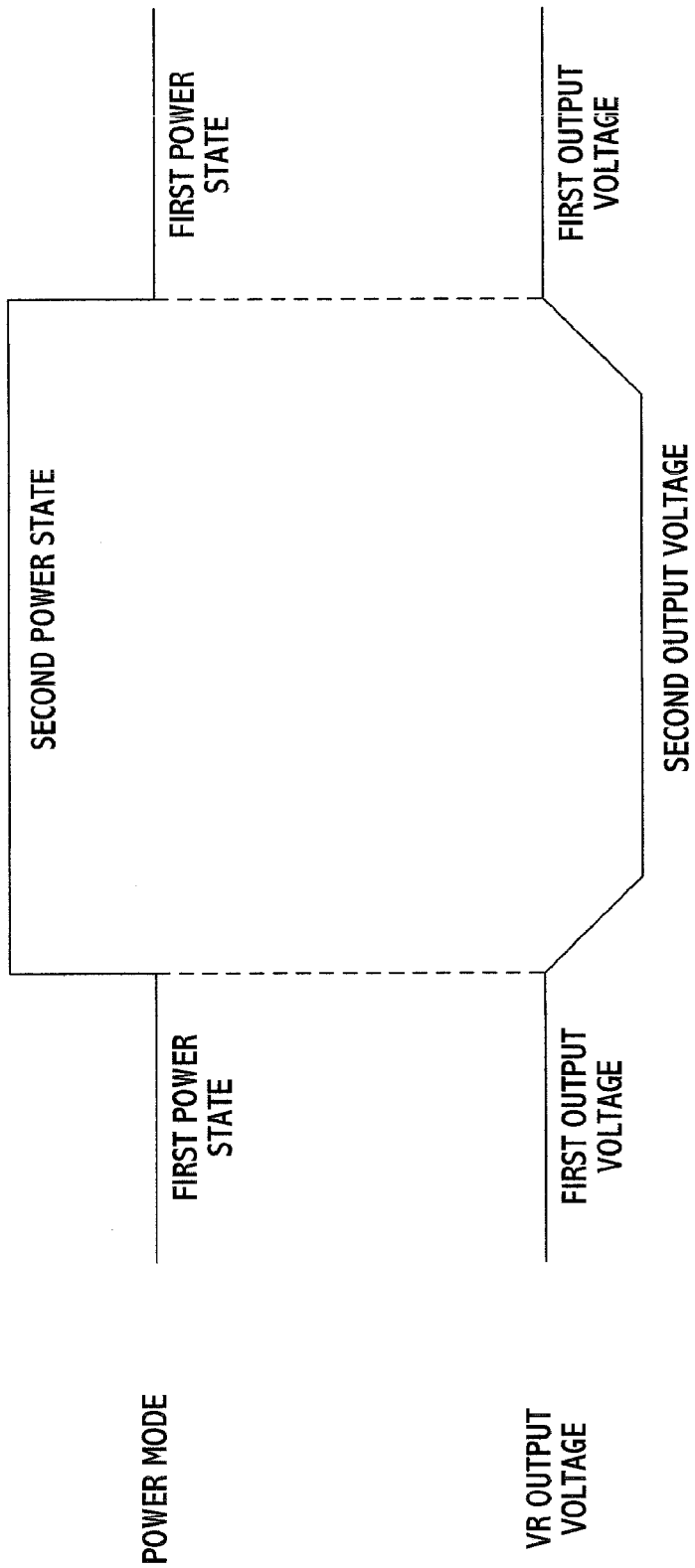
FIG. 3 is a diagram showing power control in accordance with one or more embodiments.

FIG. 3 shows an example of the power reduction that may be realized in accordance with one or more embodiments described herein. As shown, when all or a portion of the electronic device is operating in a first power state (e.g., Active State), the voltage regulators output a relative high voltage to their respective circuits or to power their respective functions. However, when the power mode signal is received, the voltage regulators output a second output voltage less than the first output voltage corresponding to a second power state.

The second power state may correspond to an idle state and the second output voltage may be significantly less than the first output voltage. In accordance with one embodiment, the second output voltage may be 5% to 10% below a nominal voltage, which may be located in a lower tolerance voltage range of a corresponding voltage regulator and/or the circuit or function to be powered by the output of the voltage regulator.

The output of the voltage regulator may return to the first output voltage corresponding to the first power state when another power mode signal is receive indicative of such a state.

Figure 4:
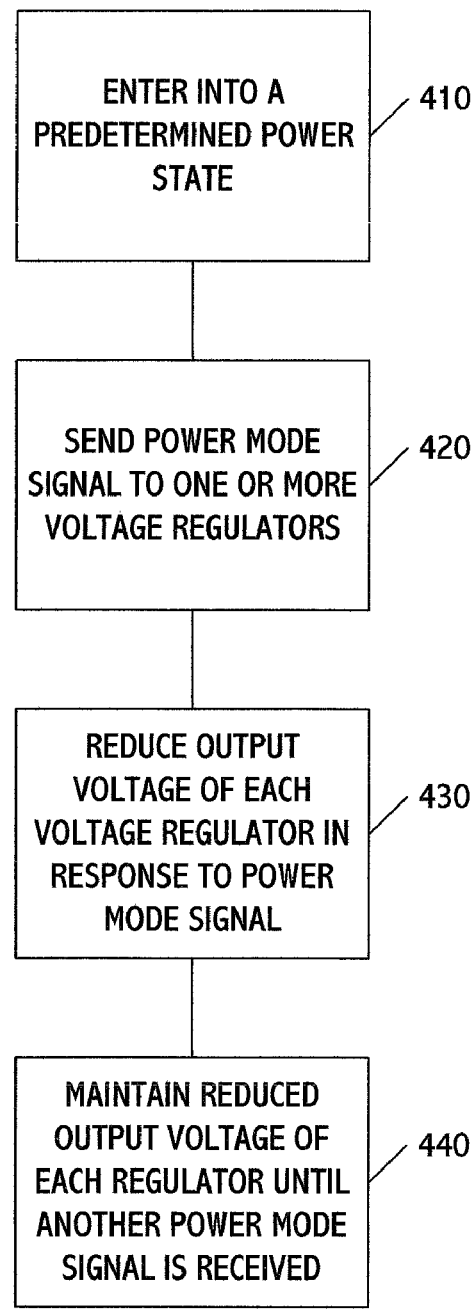
FIG. 4 is a diagram showing operations included in one embodiment of a power control method.

FIG. 4 shows operations included in a method for managing power in an electronic device. The method may be performed in an electronic device as shown in FIGS. 1 and 2, or in any other electronic whether portable or stationary, battery powered or AC powered.

In an initial operation, the operating system of the device issues a signal causing the device to enter into a predetermined power state. (Block 410). The predetermined power state may be any power state that causes the device, or any portion of the device, to consume less power than in a power state where the most power is consumed.

For example, in an electronic device where power states S0-S5 are observed (as previously discussed), the S0 state corresponds to an ON state and the S1 to S5 states correspond to lower power states. Thus, in accordance with the present embodiment, the predetermined power state in Block 410 may be any of the S1 to S5 power states. In other devices, different power states may be used and Block 410 may therefore be performed to set the device to a lower power state in an analogous manner.

The predetermined (lower) power state may be generally referred to as an idle power state or an S0ix state in a CPPM architecture. In the notation S0ix state, the "i" may represent an idleness period within an S0 state and the "x" may represent a placeholder for the duration of the idleness period, with larger values of "x" representing longer durations. Also, in the CPPM architecture, idle windows are created during one or more of various power states including the S0 state. This same approach to power management including the creation of idleness periods and the reduction of output voltages of voltage regulators may be applied to any type of advanced platform power management technique or architecture.

In a second operation, a power mode signal is sent to one or more voltage regulators in response to the device entering the predetermined power state. (Block 420). The power mode signal may be generated from a power control circuit. According to one application, the power control circuit is the chipset or processor shown in FIG. 1 and the power mode signal may be output from a power mode pin of the chipset or processor. The power mode pin may be a specialized pin for controlling the voltage regulators, or the power mode signal may be generated from a pre-existing pin of the chipset or processor. In other embodiments, the power mode signal may be generated from another circuit or chip of the device including but not limited to a power management system chip.

In order to increase power savings, the power mode signal may be sent to as many voltage regulators as possible while still maintaining essential functions that are required to be performed in that state. This may result in lowering the power states of different circuit sections (or so-called power islands) of the device. For example, when the power mode of the electronic device changes from an active state to an idle state, the power mode signal may be sent to voltage regulators that respectively power different circuits or functions of the electronic device. The different circuits may include, for example, the display, input devices, speaker and microphone circuits, and USB circuit as well as other circuits. However, the voltage regulator that powers at least the receiver of the wireless communication circuit may be maintained at a higher power state, in case an incoming call is received (in the case were the device is or includes a mobile phone circuit).

In a third operation, each voltage regulator that receives the power mode signal reduces its output voltage to within a predetermined voltage band. (Block 430). The predetermined band may correspond to a range of voltages lower than an active-power voltage range. In accordance with one embodiment, if the predetermined power state corresponds to an idle state, the predetermined voltage band is set to a lower end of the operating tolerance band of the device, e.g., between −5% and −10% of nominal voltage.

For example, a tolerance band of the system or platform voltage regulators may be +/−5% to +/−10% depending on the system design and/or the tolerance of devices performing within the specific power domain. In terms of the tolerance band, the nominal point of each voltage regulator may be considered to be the target voltage, e.g., 5.0V or 3.3V for some application. The voltage regulators may have a tolerance band around that output voltage and the voltage may move around the nominal point based on dynamic load demands.

In contrast, in systems where no dynamic load demand is implemented, each voltage regulator may regulate to the nominal point. However, this has proven to be wasteful.

According to one or more embodiments herein, the voltage regulators serve the platform power needs by reducing their output voltages down to a low-end of their respective tolerance bands. This reduction saves power in all devices connected to the voltage regulator, as a static current requirement stays constant but the voltage is reduced. As a result, power (Power=Voltage*Current) may be linearly reduced.

The output voltage reduction of each regulator may be performed in various ways. For example, if the voltage regulator includes a phase-locked loop (PLL) circuit with a voltage-controlled oscillator (VCO) circuit, the input reference signal into a phase/voltage comparator circuit of the PLL may be changed to a lower or different value. This will case the output voltage of the VCO to lower by a proportional amount. By selectively controlling the output voltage of each voltage regulator in this manner, the overall amount of power consumed by the electronic device may be lowered significantly.

In a fourth operation, the reduced output voltage(s) of the voltage regulators are maintained until another power mode signal is received. (Block 440). The second power mode signal may change the power mode of the device back to the active state or to another low-power state, depending on the functions the device is required to perform.

Figure 5:
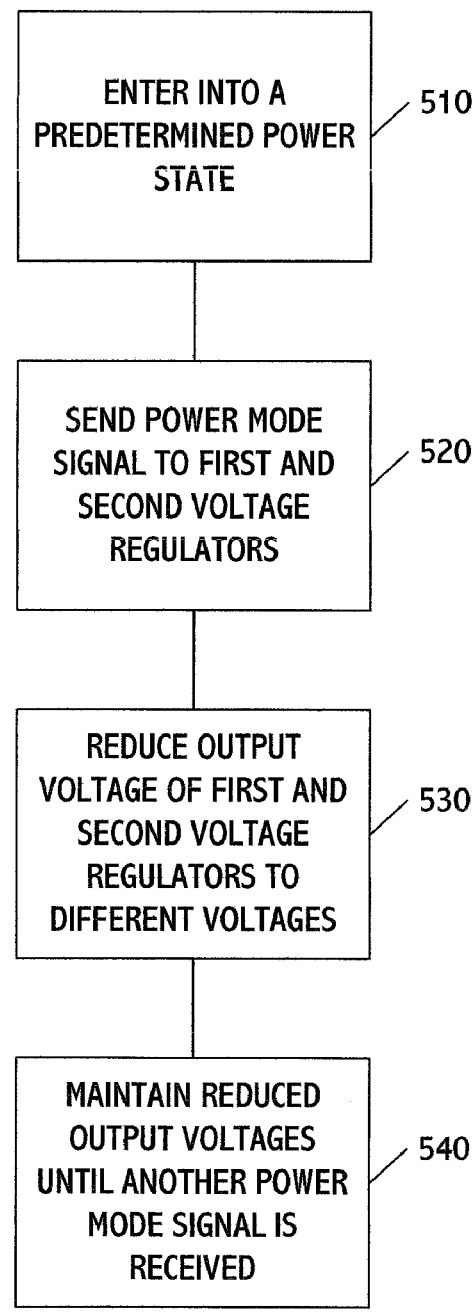
FIG. 5 is a diagram showing operations included in another embodiment of a power control method.

FIG. 5 shows operations included in another embodiment for managing power of an electronic device. Like in the embodiment of FIG. 4, an initial operation includes causing the device to enter into a predetermined power state, e.g., a lower power state. (Block 510). In a second operation, a power mode signal is generated and sent to first and second voltage regulators. (Block 520). However, unlike the previous embodiment, the first and second voltage regulators set their output voltage to within different reduced voltage ranges to match, for example, different workload or processing demands for circuits controlled by those voltage regulators. (Block 530).

For example, when the predetermined power state corresponds to an idle state, the output of the first voltage regulator may lie in a first range which is higher than a second range in which the output voltage of the second voltage regulator is set. Both ranges may be lower than a voltage range used to support operation of the device in an ON (e.g., S0) voltage state. However, because the first voltage regulator is used to power a battery charging circuit which is currently receiving power from an AC power source, the output of the first voltage regulator is set to a higher range than the output voltage of the second regulator which is used to support operation of the display (which is not required for use during battery charging in the idle power state).

In addition, or alternatively, the circuit(s) powered by the first voltage regulator may operate based on an output voltage in a first predetermined range and the circuit(s) powered by the second voltage regulator may operate based on an output voltage in a second predetermined voltage range. The first and second predetermined voltage ranges may correspond to different power states of those circuits.

The output voltage of the first and second voltage regulators may be maintained until another power mode signal is received (Block 540), thereby allowing significant power savings to be realized in spite of the different reduced voltage ranges of the first and second voltage regulators.

Figure 6:
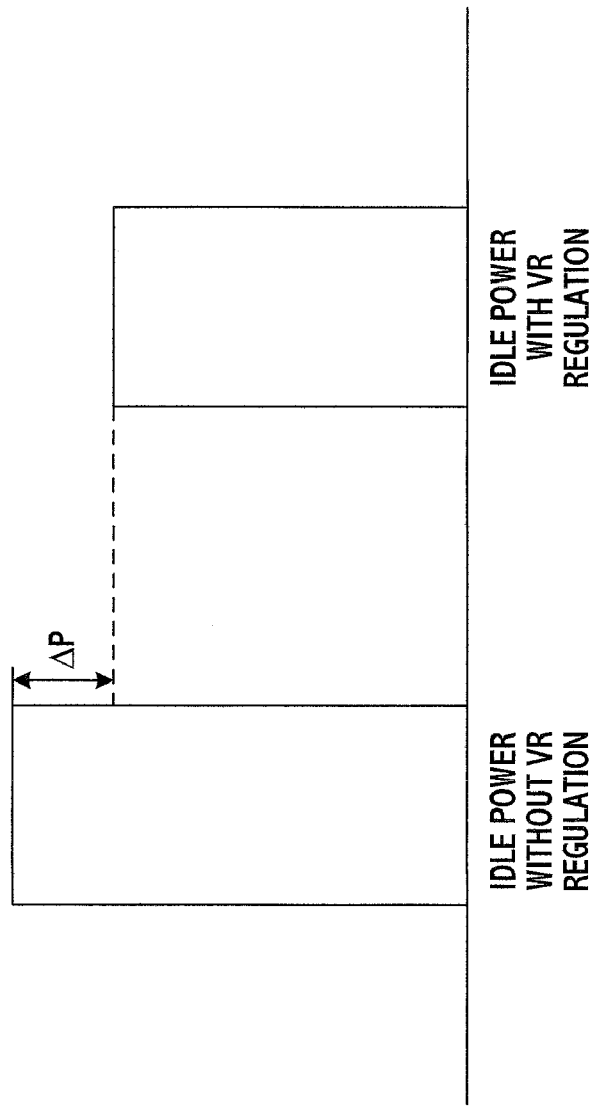
FIG. 6 is a diagram showing an example of power savings that is capable of being achieved in accordance with one or more embodiments described herein.

FIG. 6 shows a comparison between the amount of power consumed in an idle state for the mobile platform of a mobile phone when VR regulation is and is not performed. As shown by the dotted line, the amount of power savings (ΔP) expected to be achieved in one exemplary application is in the range of 12-15% in the idle state. This may translate into approximately 1.7 Watts of power savings on an 11.5 Watt idle platform when, for example, the voltage regulators were reduced to a −9% power reducing operating point.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although embodiments of the present invention have been described herein with reference to a number of illustrative embodiments, it should be understood that numerous other modifications and embodiments can be devised by those skilled in the art that will fall within the spirit and scope of the principles of the embodiments of the invention. More particularly, reasonable variations and modifications are possible in the component parts and/or arrangements of the subject combination arrangement within the scope of the foregoing disclosure, the drawings and the appended claims without departing from the spirit of the embodiments of the invention. In addition to variations and modifications in the component parts and/or arrangements, alternative uses will also be apparent to those skilled in the art.

I claim:

1. An electronic device comprising:
   a circuit to provide a power mode signal when the electronic device is to enter a reduced power state; and
   a first voltage regulator to provide a first voltage and a second voltage less than the first voltage, the first voltage regulator to provide the second voltage in response to the power mode signal, and
   a second voltage regulator to provide a third voltage and a fourth voltage less than the third voltage, the second voltage regulator to provide the fourth voltage in response to the power mode signal,
   the first voltage regulator is to output the second voltage independently from the second voltage regulator outputting the fourth voltage in response to a same signal that corresponds to the power mode signal,
   the first voltage regulator to receive the power mode signal, the second voltage regulator to receive the power mode signal, and the first and second voltage regulators to supply output voltages to power circuits or functions different from a central processor of the electronic device, and
   the first and second voltage regulators to reduce output voltages to power the circuits or functions different from the central processor in response to the power mode signal and independent from changing power to the central processor.

2. The electronic device of claim 1, wherein the second voltage to be in a first voltage range, and the fourth voltage to be in a second voltage range, and the first voltage range is different from the second voltage range.

3. The electronic device of claim 2, wherein the first voltage range and the second voltage range correspond to different power states of circuits or functions that are to be respectively powered by the first and second voltage regulators.

4. The electronic device of claim 1, wherein the circuits or functions to be powered by the first voltage regulator include at least one of a memory, an input device, an output device, a media device, a data transfer interface, a battery charging circuit, or other circuit or function that does not correspond to an operating system of the electronic device.

5. The electronic device of claim 1, wherein the second voltage of the first voltage regulator is less than the first voltage of the first voltage regulator during an idle period of an active power state in response to the power mode signal.

6. The electronic device of claim 1, wherein the predetermined power state is a reduced power state.

7. The electronic device of claim 1, further comprising a third voltage regulator to power at least a receiver of a wireless communication circuit, and the first and second voltage regulators to provide a reduced output voltage and the third voltage regulator to maintain a high output power in response to the first and second voltage regulator to receive the power mode signal.

8. The electronic device of claim 1, wherein the first voltage regulator to provide the second voltage at a low end of a first range corresponding to the first voltage regulator, and the second voltage regulator to provide the fourth voltage at a low end of a second range corresponding to the second voltage regulator, the second range being different that the first range.

9. A power control method comprising:
providing a power mode signal when the electronic device enters a reduced power state;
providing a first voltage from a first voltage regulator,
in response to receiving the power mode signal at the first voltage regulator, the first voltage regulator to provide a second voltage less than the first voltage,
providing a third voltage from a second voltage regulator,
in response to receiving the power mode signal at the second voltage regulator, the second voltage regulator to provide a fourth voltage less than the third voltage, and
the first voltage regulator is to output the second voltage independently from the second voltage regulator outputting the fourth voltage in response to a same signal that corresponds to the power mode signal,
the first and second voltage regulators to supply output voltages to power circuits or functions different from a central processor of the electronic device, and
the first and second voltage regulators to reduce output voltages to power the circuits or functions different from the central processor in response to the power mode signal and independent from changing power to the central processor.

10. The method of claim 9, wherein the second voltage of the first voltage regulator is to be reduced as compared to the first voltage of the first voltage regulator during an idle period of an active power state in response to the power mode signal. second range corresponding to the second voltage regulator, the second range being different than the first range.

11. The method of claim 9, further comprising powering at least a receiver of a wireless communication circuit using a third voltage regulator, and the first and second voltage regulators to provide a reduced output voltage and the third voltage regulator to maintain a high output power in response to the first and second voltage regulator to receive the power mode signal.

12. The method of claim 9, wherein the first voltage regulator to provide the second voltage at a low end of a first range corresponding to the first voltage regulator, and the second voltage regulator to provide the fourth voltage at a low end of a second range corresponding to the second voltage regulator, the second range being different than the first range.

13. An electronic device comprising:
a power control circuit to provide a power signal when the electronic device is to enter a reduced power state;
a first voltage regulator to provide a first voltage and a second voltage less than the first voltage, the first voltage regulator to provide the second voltage in response to the power signal, and
a second voltage regulator to provide a third voltage and a fourth voltage less than the third voltage, the second voltage regulator to provide the fourth voltage in response to the power signal,
the first voltage regulator is to output the second voltage independently from the second voltage regulator outputting the fourth voltage in response to a same signal that corresponds to the power signal,
the first voltage regulator to receive the power signal and to supply output voltage to power circuits or functions different from a central processor of the electronic device, and
the first voltage regulator to reduce output voltage to power the circuits or functions different from the central processor in response to the power signal and independent from changing power to the central processor.

14. The electronic device of claim 13, further comprising a third voltage regulator to power at least a receiver of a wireless communication circuit, and the first and second voltage regulators to provide a reduced output voltage and the third voltage regulator to maintain a high output power in response to the first and second voltage regulator to receive the power signal.

15. The electronic device of claim 13, wherein the first voltage regulator to provide the second voltage at a low end of a first range corresponding to the first voltage regulator, and the second voltage regulator to provide the fourth voltage at a low end of a second range corresponding to the second voltage regulator, the second range being different than the first range.

* * * * *